Figure 1:
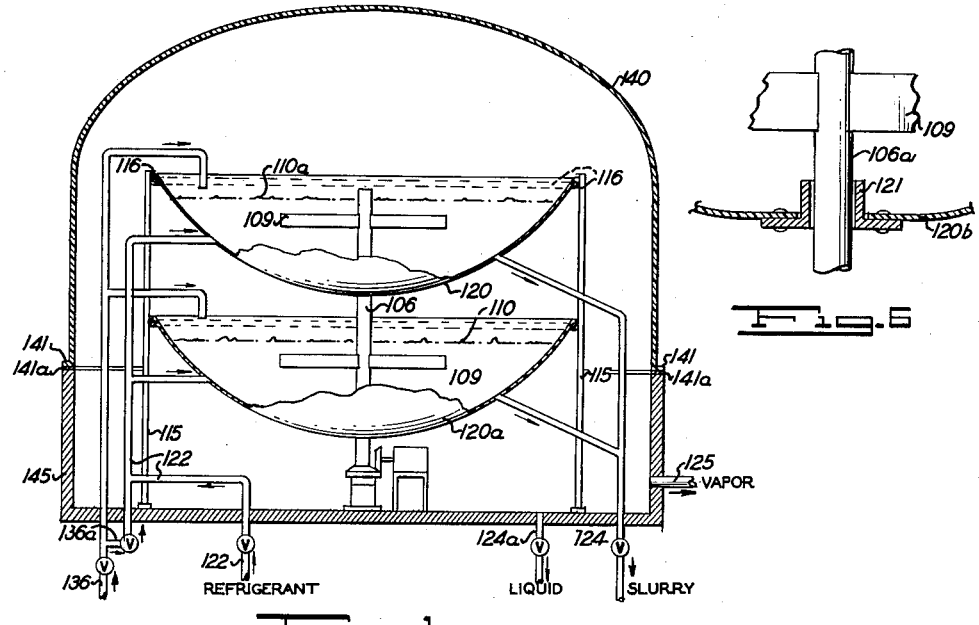

July 31, 1962 — I. B. MARGILOFF — 3,046,752
CHEMICAL APPARATUS
Filed Jan. 23, 1961 — 2 Sheets-Sheet 1

United States Patent Office 3,046,752
Patented July 31, 1962

3,046,752
CHEMICAL APPARATUS
Irwin B. Margiloff, New York, N.Y., assignor to Scientific Design Company, Inc., a corporation of Delaware
Filed Jan. 23, 1961, Ser. No. 84,214
6 Claims. (Cl. 62—123)

This invention relates to apparatus for use in processes for treating solutions in order to separate solvent therefrom, more particularly in processes for preparing fresh or potable water from sea water or brackish water (having over 500 p.p.m. of solute) wherein the saline water is partially frozen by evaporation of a water-immiscible refrigerant in contact therewith, the resulting ice is separated from the remaining salt water, and this ice is melted to give fresh or potable water, and especially to such apparatus including an enclosure which is in part collapsible and in part flexible or curved and suspended between supports.

Various proposals have been made for recovering potable water from sea water or the like materials, including direct or indirect cooling and freezing, and separation of frozen relatively pure water from the more concentrated liquid saline water. However, these processes are relatively costly especially as to the capital investment, and accordingly their commercialization has been retarded. The art is confronted by the problem of providing apparatus for use in processes for the recovery of fresh or potable water from saline water at economically low operating costs and at an attractively low capital investment.

The discoveries associated with the invention and relating to the solution of the above problems, and the objects achieved in accordance with the invention as set forth herein include the provision of; an apparatus adapted for use in refrigerating a liquid comprising the combination of an enclosure having a curved bottom suspended between rigid supports one above the other, means for introducing liquid to be refrigerated and means for introducing liquid refrigerant into the means, means for removing a mixture containing refrigerated liquid from the liquid and means for removing vaporized refrigerant from above the liquid; such an apparatus wherein the bottom is flexible and including means for agitating the liquid mixture; such an apparatus wherein the agitating means includes a paddle adapted to mix particles frozen from the liquid with the liquid; such an apparatus including a shaft carrying paddles; such an apparatus including separated suspended support means for the bottom; such an apparatus having at least two curved means adapted to support at least two bodies of liquid, one above the other; such an apparatus having a single means for removing vaporized refrigerant; such an apparatus wherein substantially all of the vapor-containing part of the enclosure is collapsible; such an apparatus wherein the means for removing vaporized refrigerant is a rigid tube passing out through the lower part of the enclosure; such an apparatus including a plurality of agitation means set in an elongated enclosure, including an upright shaft means; such an apparatus wherein each section of which is adapted to contain liquid at a maximum depth of about 18 inches; and other objects which will be apparent as details or embodiments of the invention are set forth hereinafter.

Figure 7:
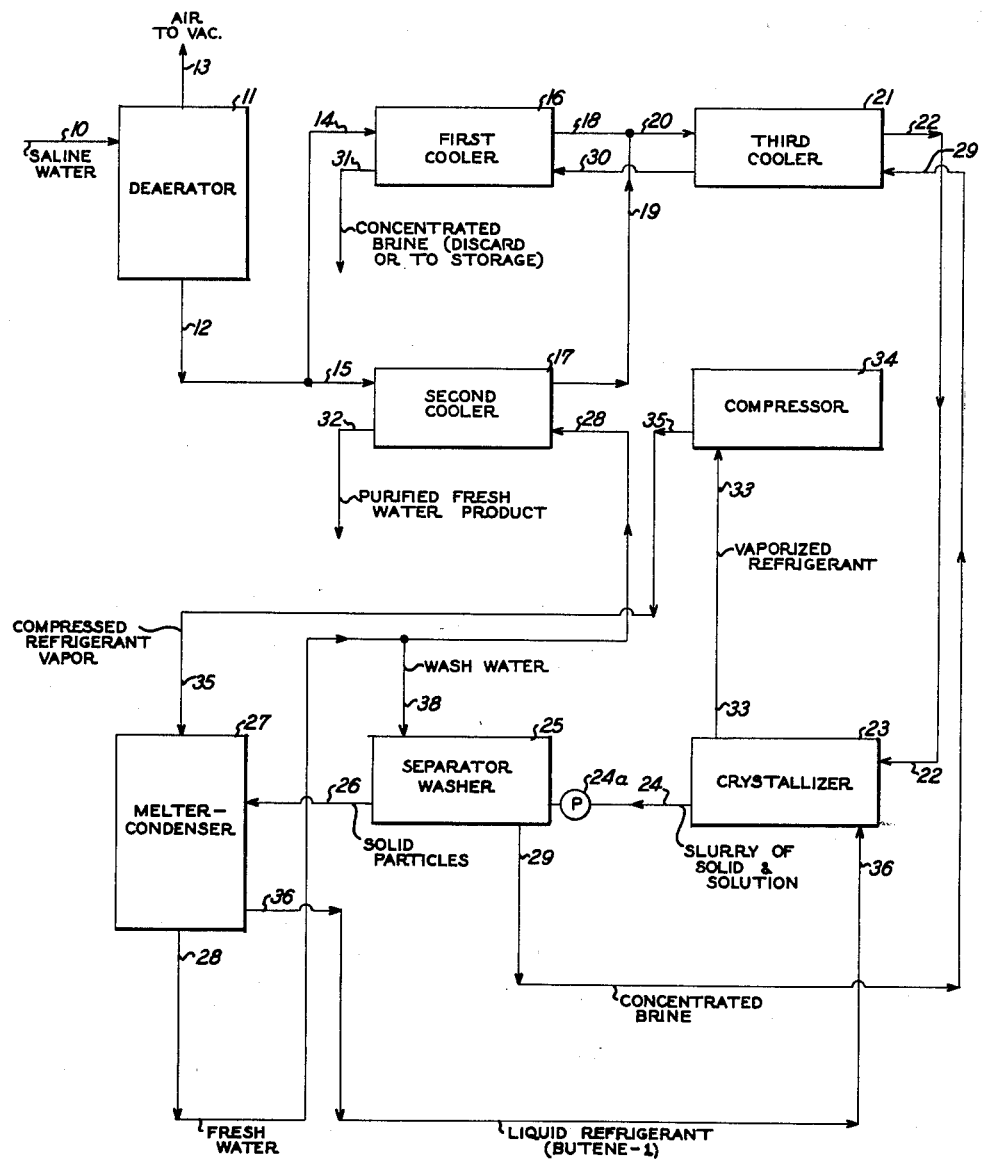

FIGURES 1, 2, 3, 4, 5 and 6 are schematic illustrations of preferred embodiments of the crystallizers of the invention, and FIGURE 7 is a schematic illustration of an overall system.

In the overall system, as illustrated in FIGURE 7, saline water (having more than 500 p.p.m. solute) enters through line 10. It is deaerated in vessel 11 by the application of vacuum and heat or steam. Air and other non-condensible dissolved gases pass out through the vacuum line 13. A portion (e.g. about two-thirds) of the deaerated saline water is passed through lines 12 and 14 into a first cooler 16 and the remainder is passed through line 15 into a second cooler 17. The cooled outlet saline water from both coolers is led through lines 18 and 19 and passed through line 20 into third cooler 21. The outlet cooled saline water from third cooler 21 is passed through line 22 into crystallizer 23. The saline water is crystallized by methods such as evaporated freezing in the crystallizer in order to produce ice crystals and brine, e.g., a liquid refrigerant (such as butene-1) is mixed therewith and vaporized. The ice crystals and brine are led through line 24 into separator-washer 25 and after separation of the brine e.g., by gravity or centrifugal filtration and washing (with wash liquor added through line 38) to remove entrained brine, the ice crystals are passed through line 26 into melter-condenser 27 where by direct heat exchange the crystals are melted to form fresh water which is passed through line 28 into the cooling side of the second cooler 17 in order to cool the saline water passing into the second cooler.

The fresh water passes out of the second cooler 17 through line 32 and is taken off as fresh water product; i.e., of not over 500 p.p.m. of solute.

The brine which is removed from the separator-washer 25 through line 29 is first passed through the cooling side of third cooler 21 and is then passed through line 30 into the cooling side of first cooler 16 to cool the saline water. The brine passing out of first cooler 16 is then removed through line 31.

The refrigerant vapors are passed from the crystallizer 23 via line 33 to compressor 34, and compressed. The compressed vapor is passed via line 35 to vessel 27 where it is liquefied, and the liquid refrigerant is passed via line 36 to the crystallizer 23.

In order to indicate still more fully the nature of the present invention, the following examples of typical procedures are set forth, it being understood that these examples are presented as illustrative only and are not intended to limit the scope of the invention.

*Example 1*

The crystallizer used in this example is analogous to that shown in FIGURE 1. It includes sections 120 (and optionally 120a) to hold a shallow pool of liquid with a relatively large surface area 110. The pool may be circular or of any other convenient shape.

Figures 2, 5:
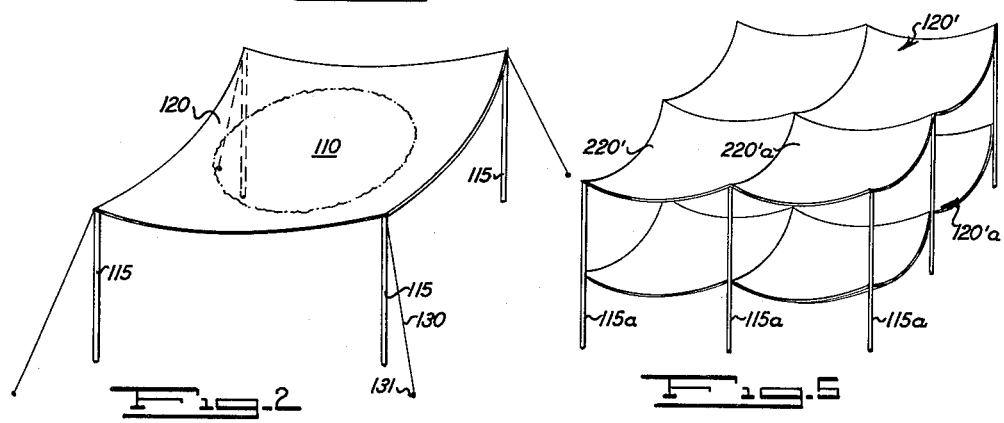

It is supported by poles 115 (arranged as shown in FIGURE 2). The assembly is set in an enclosure including a base 145 which may be made of concrete or the like material set on or in the ground and it may be lined with a neoprene or the like material. It also includes an upper section 140 which may be made of nylon fabric or the like flexible material and this may be treated with neoprene rubber or the like material to render it impervious. For fire resistance, it may be made of glass fabric impregnated with silicone elastomer or the like. The upper section is joined to the lower section by any convenient means 141. This may be a ring clamp arrangement held by bolts or the like, and the joint may be cemented or provided with gasket means 141 to make the enclosure gas tight.

The cable 130 and anchor means 131 (FIGURE 2) may be within the enclosure. Alternatively the anchor and part of the cable may be outside thereof. Hooks or loops may be provided (not shown) on the enclosure 140 for attaching the inside and the outside parts of the cable. Instead of cables, rigid cross supports (not shown) may be provided between the tops of some or all of the poles. The agitation means includes one or more paddles or the like agitators 109, each connected to the vetrical shaft 106 provided with suitable bearings and seals (not shown), and a motor provided with a suitable support (not shown). The motor may be inside, below or above the enclosure, with suitable seals in the latter case as well as if the motor is below (not shown).

The liquid to be refrigerated is introduced via line 136 and the refrigerant liquid is introduced via line 122. In the normal operation of the crystallizer the liquid in each section is at about a height of about 18 inches and is indicated by 110. A slurry of solid and liquid is withdrawn via line 124, and vaporized refrigerant vapors are withdrawn via line 125. Line 125 may be made of metal or of the same material as enclosure 140. Line 124a is provided for with drawing fluid which may pass down on to base 145.

As shown in FIGURE 6, each section or membrane may be provided with a riser 121 fitting around the shaft 106a carrying paddles 109. The shaft may be hollow and rotate around a fixed support (not shown). Desirably, some feed liquid is added via line 136a and mixed with the refrigerant (under a hydrostatic head of at least about 18 inches to avoid boiling at the refrigerant feed point) and the mixture is fed via line 122.

Raw seawater (e.g. 3.5 percent dissolved solids) is fed into a deaeration column operated at about 10 mm. Hg and air is stripped and removed overhead. The deaerated sea water passes out of the bottom of the column at 54° F. and is split into two streams, approximately one-third passing through a first cooler and the remainder passing through a second cooler. The coolers are sized so that the deaerated waters passing out of both coolers are at the same temperature, 38.2° F. The two outlet streams are combined and passed into a third cooler where they are cooled to a temperature of 34.2° F., and the resulting liquid is passed into the crystallizer 100 via line 122. Liquid commercial butene (or butene-1) is introduced into the crystallizer via line 122 and directly contacted with the cooled deaerated water to form ice crystals and brine. The temperature in the bulk of the liquid in the crystallizer is maintained at 26.3° F. by efficient agitation of the mixture in the crystallizer. Vaporized butene is removed via line 125 at a temperature of 26.3° F. and passed to a compressor. A mixture of ice crystals and brine is removed via line 124.

It may be passed onto a continuous moving filter belt from which the bulk of the brine is drained by gravity flow from the first section of the moving belt. The ice crystals containing entrained brine are then washed with water to remove the brine. The washing may be in several stages, the first with sea water, the second with lower salinity water, and so on, the last wash being of low enough salinity so that the melted crystals yield water of the desired low salinity. The washed ice crystals are passed through a chute (as a slurry in water if desired) or conveyed by a bucket or screw conveyor into a melter-condenser where they are contacted with the butene vapor which condenses during the contacting step. Part of the fresh water is passed into the separator-washer to supply the wash water and the remainder passes out of the bottom of the melter-condenser at 33° F. and is led through the cooling side of the first cooler. The fresh water leaves the outlet side of the first cooler at 48.8° F. and is stripped of dissolved butene in a fresh water stripper operated at about 10 mm. Hg. The stripped fresh water is removed from the bottom of the stripper (not shown) and collected as product. There is obtained an overall yield of fresh water (having not over 500 p.p.m. of solute) of approximately one-third by weight of the raw sea water feed.

The brine which is separated from the ice crystals on the moving belt is passed through the third cooler at a temperature of 27° F., and is then passed into the cooling side of the second cooler at a temperature of 33° F. The brine leaves the outlet side of the second cooler at 48.6° F. and is stripped of dissolved butene in a stripper (not shown) operated at about 10 mm. Hg and passes out of the bottom of the stripper at 54° F. as spent brine. The stripped butene from the brine and the fresh water strippers is compressed, condensed and passed back into the crystallizer.

The level 110 of liquid supported on section 120a may be such as to be above the bottom part of section 120, the effective maximum depth of the liquid with the agitator running being about 18 inches. The body of liquid is more shallow at regions removed from near the center. This arrangement provides for more rapid disengagement of vapor from liquid.

*Example 2*

Figures 3, 4:
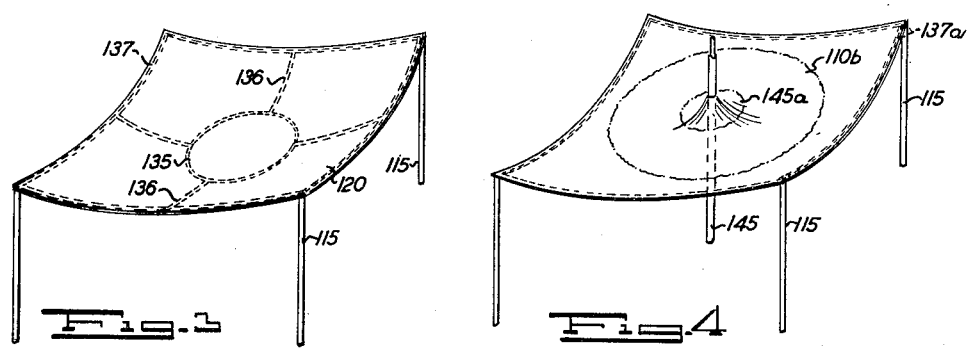

The crystallizer used in this example is generally analogous to FIGURE 1, but includes supports as shown in FIGURE 3. It is provided with several cables or wires 135, 136 and 137 which are connected from the top of the poles 115 and pass under each section 120 and serve to support the section 120. Wire 135 is in the form of a ring.

The procedure set forth in Example 1 is repeated using this apparatus and similar results are obtained.

*Example 3*

The crystallizer used in this example is analogous to that of FIGURE 1 but includes a support as shown in FIGURE 4, forming pool 110b. The flexible fabric is raised by this support, as indicated by 145a. Cables or wires 137a are provided at the edges (suitably attached) and anchored by suitable means to poles 115. Support means 145 may be a pipe or hollow member, in which the agitation shaft may rotate, the agitator blades being slanted downward into the pool of liquid.

The procedure set for in Example 1 is repeated using this apparatus and similar results are obtained.

*Example 4*

The apparatus of FIGURE 1 is constructed as indicated in FIGURE 5 to provide an enclosure having a plurality of superimposed sections 120' and 120'a and a plurality of sections 220' and 220'a arranged side by side, all supported by poles 115a. Each series of superimposed sections has its own agitation means (not shown) and each may have its own feed and slurry withdrawal means. The whole assembly may be in an enclosure analogous to FIGURE 1 and use a single vapor withdrawal line. Alternatively, each series of superimposed sections may be like FIGURE 1, and operate independently of the others, but use common support poles at their contiguous sides.

The procedure of Example 1 is repeated and similar results are obtained.

The adjacent sections may communicate to form relatively long channels. They may also be made long relative to their width. Long channels permit the use of fewer agitators. Propeller type agitators may be used and arranged with shafts angled to set above each section 120.

Liquid depths of about 18 inches are used. Greater depths are operative but unattractive from the economic viewpoint, especially as to the cost of compressing the refrigerant vapor. Preferred refrigerants are butene-1 and commercial butene (which is a mixture of 95% butene-1 and 5% of similar compounds, by weight). Other inert water-immiscible materials boiling in the range of about 0° to 35° F. can be used in the process as well as close boiling mixtures of such refrigerants. A desirable boiling point range is 10° to 30° F., and 13° to 25° F. is a preferred boiling point range.

If desired the conditions in the sections may be varied and the brine residue from one stage or section may be used as the feed to another section or stage operating at a lower temperature as set forth in detail in U.S. application Ser. No. 75,958 filed December 15, 1960, entitled "Chemical Process."

The upper section of the enclosure may be of any suitable flexible reinforcing material such as woven cotton, wool, nylon, or polyester fiber, glass fibers, and the like impregnated with any suitable flexible sealant such as neoprene, silicone rubber, fluorocarbon elastomers and the like, or mixtures thereof. The enclosure may also be fabricated of flexible plastic film such as nylon polyesters, polyethylene, and the like or of thin ductile metal sheet such as aluminum. Fabrication may be by sewing, cementing or the like.

The enslosure or assembly may be insulated if desired, e.g. by a foam of polyurethane, or the like.

In the present system, a relatively large vapor disengaging surface is provided relative to the volume of liquid.

Instead of a filter belt, a centrifuge may be used; and also a butene vapor treatment may be used instead of the water wash. These procedures are set forth in detail in U.S. application Ser. No. 77,675, filed December 22, 1960, entitled "Chemical Process and Apparatus."

It is indeed surprising that water desalinization may be carried out in accordance with the invention in such an efficient and economic manner and at such relatively low capital investment requirements.

In view of the foregoing disclosures, variations and modifications thereof will be apparent to one skilled in the art, and it is intended to include within the invention all such variations and modifications except as do not come within the scope of the appended claims:

What is claimed is:

1. An apparatus adapted for use in refrigerating a liquid comprising the combination of: an enclosure having a rigid bottom portion and a flexible top portion; a horizontally disposed flexible sheet adapted to contain a shallow pool of liquid of uneven depth thereon; support members rigidly affixed to the said bottom portion of said enclosure and the periphery of said flexible sheet so as to maintain said flexible sheet within said enclosure; inlet means adapted to introduce a liquid onto said flexible sheet; refrigerant inlet means adapted to introduce a liquid refrigerant into the lower portion of said flexible sheet; outlet means for withdrawing a slurry from said flexible sheet; and outlet means adapted to withdraw vaporous refrigerant from said enclosure.

2. The apparatus of claim 1 wherein agitation means is provided to mix material on said flexible sheet.

3. The apparatus of claim 2 wherein said agitation means is a shaft carrying paddles.

4. The apparatus of claim 1 wherein said flexible sheet is a concave surface.

5. The apparatus of claim 1 wherein at least two flexible sheets are located within said enclosure.

6. The apparatus of claim 4 wherein said flexible sheet is adapted to maintain a liquid pool having a maximum depth of 18 inches.

References Cited in the file of this patent
UNITED STATES PATENTS

| | | |
|---|---|---|
| 2,821,304 | Zarchin | Jan. 28, 1958 |
| 2,904,511 | Donath | Sept. 15, 1959 |